United States Patent
Classen et al.

(10) Patent No.: US 8,683,863 B2
(45) Date of Patent: Apr. 1, 2014

(54) MICROMECHANICAL YAW RATE SENSOR HAVING TWO SENSITIVE AXES AND COUPLED DETECTION MODES

(75) Inventors: Johannes Classen, Reutlingen (DE); Burkhard Kuhlmann, Reutlingen (DE); Daniel Christoph Meisel, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 12/987,732

(22) Filed: Jan. 10, 2011

(65) Prior Publication Data

US 2011/0185813 A1 Aug. 4, 2011

(30) Foreign Application Priority Data

Jan. 12, 2010 (DE) .................. 10 2010 000 811

(51) Int. Cl.
*G01C 19/56* (2012.01)
(52) U.S. Cl.
USPC ..................... 73/504.14; 73/504.04
(58) Field of Classification Search
USPC ............... 73/504.12, 504.14, 504.02, 504.04
See application file for complete search history.

(56) References Cited

U.S. PATENT DOCUMENTS

| | | | | |
|---|---|---|---|---|
| 6,739,193 B2 * | 5/2004 | Franz et al. | ................ | 73/514.29 |
| 6,752,017 B2 * | 6/2004 | Willig et al. | ............... | 73/504.04 |
| 6,928,872 B2 * | 8/2005 | Durante et al. | ............ | 73/504.04 |
| 7,316,161 B2 * | 1/2008 | Willig et al. | ............... | 73/504.12 |
| 8,261,614 B2 * | 9/2012 | Hartmann et al. | ......... | 73/504.12 |
| 2010/0043549 A1 * | 2/2010 | Classen et al. | .................. | 73/510 |
| 2010/0192690 A1 * | 8/2010 | Classen et al. | ............ | 73/504.12 |
| 2010/0326188 A1 * | 12/2010 | Classen et al. | ............ | 73/504.12 |
| 2012/0060604 A1 * | 3/2012 | Neul et al. | ................. | 73/504.12 |

FOREIGN PATENT DOCUMENTS

| | | |
|---|---|---|
| DE | 10 2007 054 505 | 5/2009 |
| EP | 1 365 211 | 11/2003 |
| WO | WO 2009/062786 | 5/2009 |

\* cited by examiner

*Primary Examiner* — Helen Kwok
(74) *Attorney, Agent, or Firm* — Kenyon & Kenyon LLP (57) ABSTRACT

In a yaw rate sensor with a substrate having a main extent plane and with a first and second partial structure disposed parallel to the main extent plane, the first partial structure includes a first driving structure and the second partial structure includes a second driving structure, the first and second partial structure being excitable by a driving device, via the first and second driving structure, into oscillation parallel to a first axis parallel to the main extent plane, the first partial structure having a first Coriolis element and the second partial structure having a second Coriolis element, the yaw rate sensor being characterized in that the first and second Coriolis elements are displaceable by a Coriolis force parallel to a second axis, which is perpendicular to the first axis, and parallel to a third axis, which is perpendicular to the first and second axis, the second axis extending parallel to the main extent plane, and the first Coriolis element being connected to the second Coriolis element via a coupling element.

11 Claims, 8 Drawing Sheets

MICROMECHANICAL YAW RATE SENSOR HAVING TWO SENSITIVE AXES AND COUPLED DETECTION MODES

CROSS-REFERENCE TO RELATED APPLICATIONS

The present application claims priority to Application No. 10 2010 000 811.7, filed in the Federal Republic of Germany on Jan. 12, 2010, which is expressly incorporated herein in its entirety by reference thereto.

FIELD OF THE INVENTION

The present invention relates to a micromechanical yaw rate sensor having two sensitive axes and coupled detection modes.

BACKGROUND INFORMATION

Certain yaw rate sensors are conventional. For example, a yaw rate sensor is described in German Published Patent Application No. 10 2007 054 505, which has a first and second partial structure disposed above a main extent plane of a substrate. The yaw rate sensor has a device which, via a first and second driving structure, excite the first and second partial structure into oscillation parallel to a first axis parallel to the main extent plane of the substrate. The yaw rate sensor further includes a first and a second Coriolis element which are displaced by a Coriolis force. The first and the second Coriolis element are connected to a central spring element.

European Published Patent Application No. 1 365 211 describes a yaw rate sensor the sensitive mass of which is displaceable in two mutually perpendicular directions.

SUMMARY

According to example embodiments of the present invention, a yaw rate sensor has certain advantages over conventional systems, e.g., due to the connection of the first Coriolis element to the second Coriolis element via a coupling element and due to the displaceability of the first Coriolis element and the second Coriolis element in two mutually perpendicular directions, a first interfering natural frequency of a first interfering natural mode is considerably separated from a first detection natural frequency of a first detection natural mode, and a second interfering natural frequency of a second interfering natural mode is considerably separated from a second detection natural frequency of a second detection natural mode. In the first interfering natural mode the displacements of the first and second Coriolis element parallel to a second axis, which is perpendicular to the first axis, are in the same direction, and in the first detection natural mode the displacements of the first and second Coriolis element parallel to the second axis are in opposite directions. In the second interfering natural mode, the displacements of the first and second Coriolis element parallel to a third axis, which is perpendicular to the first and to the second axis, are in the same direction, and in the second detection natural mode the displacements of the first and second Coriolis element parallel to the third axis are in opposite directions. That considerable separation of the interfering natural frequencies from the detection natural frequencies has the advantage over conventional systems that external interfering accelerations or linear accelerations are suppressed to a comparatively great extent, with the result that the yaw rate sensor has a comparatively low sensitivity to vibration or, in other words, has an improved resistance to vibration. It is also advantageous that production-related deviations of the masses or the spring rigidities of components of the yaw rate sensor from the nominal quantities have comparatively little effect on the greatest possible achievable vibration resistance of the yaw rate sensor.

Example embodiments provide that the first and second Coriolis elements are connected to the substrate via attachment spring elements. Due to the attachment to the substrate, it is possible to reduce the displacement of the Coriolis elements parallel to the second and third axis caused by interfering accelerations, with the result that the first and second interfering natural frequencies are considerably increased. In that manner, an improved resistance to vibration may be achieved.

Example embodiments provide that the first partial structure is disposed parallel to the second axis beside the second partial structure. Due to the partial structures disposed parallel to the second axis, upon excitation parallel to the first axis (inverse tuning fork principle) a comparatively high insensitivity to interfering acceleration, especially centrifugal accelerations in the case of rotation about the second or third axis, may be achieved.

Example embodiments provide that the first and second Coriolis elements are configured as frames, the first Coriolis element being connected to a first driving structure via spring elements, the second Coriolis element being connected to a second driving structure via further spring elements, the first Coriolis element surrounding the first driving structure and the second Coriolis element surrounding the second driving structure. By virtue of the arrangement of the driving structures in the inner region of the Coriolis elements configured as frames, the yaw rate sensor has a comparatively high insensitivity to interfering acceleration, especially centrifugal accelerations in the case of rotation about the second or third axis, and the driving structures are of a comparatively small extent parallel to the first and second axis.

Example embodiments provide that the first partial structure has a first detection mass and the second partial structure has a second detection mass, the first and second detection masses being attached to the substrate in a substantially fixed position with regard to movement parallel to the first axis and being displaceable parallel to the second and third axis, the first detection mass being coupled to the first Coriolis element via first detection springs and the second detection mass being coupled to the second Coriolis element via second detection springs, the first and second detection springs being configured to be rigid parallel to the second and third axis. By virtue of the fixed-position attachment of the detection masses in the driving direction (first axis) it is possible for the detection movements to be largely decoupled from the driving movement, thereby considerably reducing mechanical crosstalk between driving movement and detection movements (reduction of the mechanical quadrature).

Example embodiments provide that the Coriolis element is configured as a rocker, the first Coriolis element being connected to the first partial structure via first torsion spring elements and the second Coriolis element being connected to the second partial structure via second torsion spring elements, the first torsion spring elements forming a first axis of rotation which is parallel to the main extent plane and the second torsion spring elements forming a second axis of rotation which is parallel to the main extent plane, the first Coriolis element having an asymmetrical mass distribution with respect to the first axis of rotation and the second Coriolis element having an asymmetrical mass distribution with respect to the second axis of rotation, the first Coriolis element being rotatable about the first axis of rotation by a Coriolis force acting parallel to the third axis and the second Coriolis element being rotatable about the second axis of rotation by a Coriolis force acting parallel to the third axis. If the Coriolis elements are configured as rockers by asymmetrical mass distribution, it is possible for differential evaluation of the signals to be already carried out in each individual partial structure. In addition, with a comparatively high flexural rigidity of the torsion spring elements parallel to the third axis, the displacement of the Coriolis elements due to interfering effects caused by electrical voltages at the electrodes disposed underneath the Coriolis elements is comparatively small, with the result that comparatively minor interfering signals occur.

Example embodiments provide that the first axis of rotation parallel to the second axis extends centrally relative to the extent of the first Coriolis element parallel to the first axis, and that the second axis of rotation parallel to the second axis extends centrally relative to the extent of the second Coriolis element parallel to the first axis.

Example embodiments provide that the first Coriolis element has a first heavy side and a first light side and the second Coriolis element has a second heavy side and a second light side, the first and second heavy side having a greater mass moment of inertia with respect to the first and second axis of rotation than does the first and second light side, the first heavy side being connected via the coupling element to the second heavy side.

Example embodiments provide that the first heavy side is connected via the coupling element to the second light side. With that arrangement of the Coriolis elements, in the case of a yaw rate about the second axis an anti-phase torsional movement of the Coriolis elements about the axis of rotation occurs. In the case of interfering accelerations parallel to the third axis, an in-phase torsional movement of the Coriolis elements about the axis of rotation occurs. The coupling element is loaded to a greater extent by the in-phase torsional movement than in the case of anti-phase torsional movement. The in-phase torsional movement is impeded to a comparatively great extent by the coupling element, with the result that the displacement of the Coriolis elements parallel to the third axis is smaller than in the case of anti-phase torsional movement. As a result, the second interfering natural frequency of the second interfering natural mode is increased in comparison with the second detection natural frequency of the second detection natural mode.

Exemplary embodiments of the present invention are illustrated in the drawings and described in more detail in the following description.

DETAILED DESCRIPTION

In the various Figures, identical parts are always provided with the same reference numerals and therefore are normally named or mentioned only once.

Figure 1:
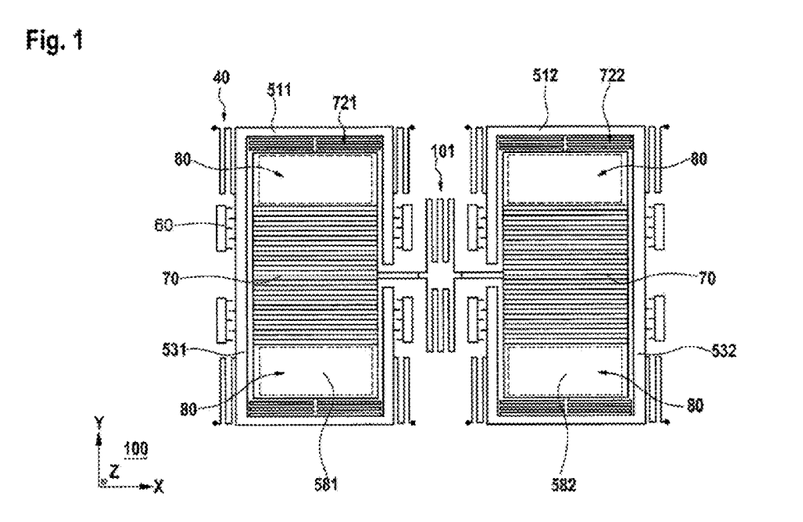
FIG. 1 is a schematic illustration in plan view of a yaw rate sensor in accordance with an exemplary embodiment of the present invention.

FIG. 1 is a schematic illustration in plan view of a yaw rate sensor in accordance with an exemplary embodiment of the present invention. The yaw rate sensor has a substrate 50 having a main extent plane 100, and has a first and second partial structure 511, 512. First and second partial structures 511, 512 are disposed parallel to main extent plane 100 and have a first and second driving structure 531, 532. Via first and second driving structures 531, 532, first and second partial structures 511, 512 are excited by driving device 60 into oscillation parallel to a first axis X parallel to main extent plane 100. Driving device 60 is in the form of capacitively acting comb driving structures. Those comb driving structures have finger electrodes both on the driving structures 531, 532 and on the substrate fixture of the driving comb structures, which finger electrodes are interdigitated. The fixed electrodes on the substrate mesh with the movable electrodes on driving structure 531, 532. If an electrical potential alternating with time is applied to the electrodes, driving structure 531, 532 is excited into oscillation parallel to first axis X. Each driving structure 531, 532 is connected to substrate 50 via four connecting springs 40. Connecting springs 40 are in the form of beam springs folded in a meander shape and are oriented in such a manner that partial structures 511, 512 are movable parallel to first axis X and are in a fixed position parallel to a second axis Y, which is perpendicular to first axis. X, and parallel to a third axis Z, which is perpendicular to first axis X and second axis Y. Second axis Y extends parallel to main extent plane 100. It is possible for connecting springs 40 to have a different geometry affording a direction-dependent spring rigidity. First and second partial structures 511, 512 have a first and second Coriolis element 581, 582. First and second Coriolis elements 581, 582 are displaceable parallel to second axis Y and displaceable parallel to third axis Z. Coriolis elements 581, 582 are arranged on partial structures 511, 512 in such a manner that the yaw rate sensor is mirror-symmetrical with respect to a plane disposed between partial structures 511, 512 and oriented perpendicular to main extent plane 100. First Coriolis element 581 is furthermore connected to second Coriolis element 582 via a coupling element 101. First and second driving structures 531, 532 each have an opening on the side toward coupling element 101. One Coriolis element 581, 582 in each case is connected to coupling element 101 through a respective opening. Coupling element 101 is configured to be flexible parallel to first, second and third axis X, Y, Z. Coupling element 101 has two beams folded in a meander shape. Other geometries of the coupling element that allow flexible movements parallel to the three axes X,Y, Z are also possible. First and second Coriolis elements 581, 582 are connected to first and second driving structures 531, 532, respectively, via spring elements and further spring elements 721, 722, respectively. The meander-folded spring elements 721, 722 are configured to be flexible parallel to second and third axis Y, Z and to be rigid parallel to first axis X. Other geometries meeting the requirements in terms of flexural rigidities are also possible for spring elements 721, 722.

First and second Coriolis elements 581, 582 have centrally relative to their extent parallel to the second axis a single comparatively large grid structure 70 with movable electrodes. Disposed in the empty spaces of grid structures 70 there are fixed electrodes which are connected to a strip conductor plane lying therebeneath. The movable electrodes and the fixed electrodes make it possible to detect displacement of first and second Coriolis element 581, 582 parallel to second axis Y. Beneath first and second Coriolis elements 581, 582, two regions with further electrodes 80 (trampoline structure) are disposed on the substrate. Those regions with further electrodes 80 are indicated by dashed or dotted lines. Displacement of Coriolis elements 581, 582 parallel to third axis Z causes a change in capacitance at further electrodes 80, thereby making it possible to detect a displacement of first and second Coriolis elements 581, 582 parallel to third axis Z. Alternatively, it is possible for a single comparatively large region of a trampoline structure to be arranged centrally in Coriolis elements 581, 582 and for two grid structures 70 to be arranged in the regions above and below the trampoline structure.

First and second partial structures 511, 512 are excited into anti-parallel oscillation parallel to the first axis with anti-phase displacement of the two partial structures 511, 512 (tuning fork principle). Since the two partial structures 511, 512 are constructed symmetrically to each other and have substantially identical masses, the center of mass of the yaw rate sensor remains stationary during a cycle of the anti-parallel primary oscillation. As a result, the yaw rate sensor outputs neither a linear impulse nor a torque, thereby minimizing energy exchange with the surroundings.

When a yaw rate occurs about third axis Z, a Coriolis force parallel to second axis Y acts on Coriolis elements 581, 582. That Coriolis force causes displacement of Coriolis elements 581, 582 parallel to second axis Y, which is detected by the movable electrodes of grid structure 70 and the fixed electrodes. Due to the anti-phase oscillation of the two partial structures 511, 512, the Coriolis force acts on the two Coriolis elements in opposite directions. During a first half of an oscillation cycle of partial structures 511, 512, for example, a Coriolis force in the positive direction of second axis Y acts on first Coriolis element 581 whereas a Coriolis force in the negative direction of second axis Y acts on second Coriolis element 582. During the next half of the oscillation cycle, a Coriolis force in the negative direction of second axis Y acts on first Coriolis element 581 whereas a Coriolis force in the positive direction of second axis Y acts on second Coriolis element 582. That makes possible a differential evaluation of the displacement of Coriolis elements 581, 582 detected by the movable electrodes of grid structure 70 and the fixed electrodes. In that manner, interference with the yaw rate detection caused by linear accelerations is suppressed.

When a yaw rate occurs about second axis Y, a Coriolis force parallel to third axis Z acts on Coriolis elements 581, 582 and causes displacement of Coriolis elements 581, 582 parallel to third axis Z. Due to the anti-phase movement of partial structures 511, 512, the Coriolis force acts on Coriolis elements 581, 582 in opposite directions and causes Coriolis elements 581, 582 to be displaced in opposite directions. It is therefore possible for the evaluation by further electrodes 80 to take place differentially. As a result, the yaw rate sensor is comparatively insensitive to interfering linear accelerations parallel to third axis Z.

Figure 2:
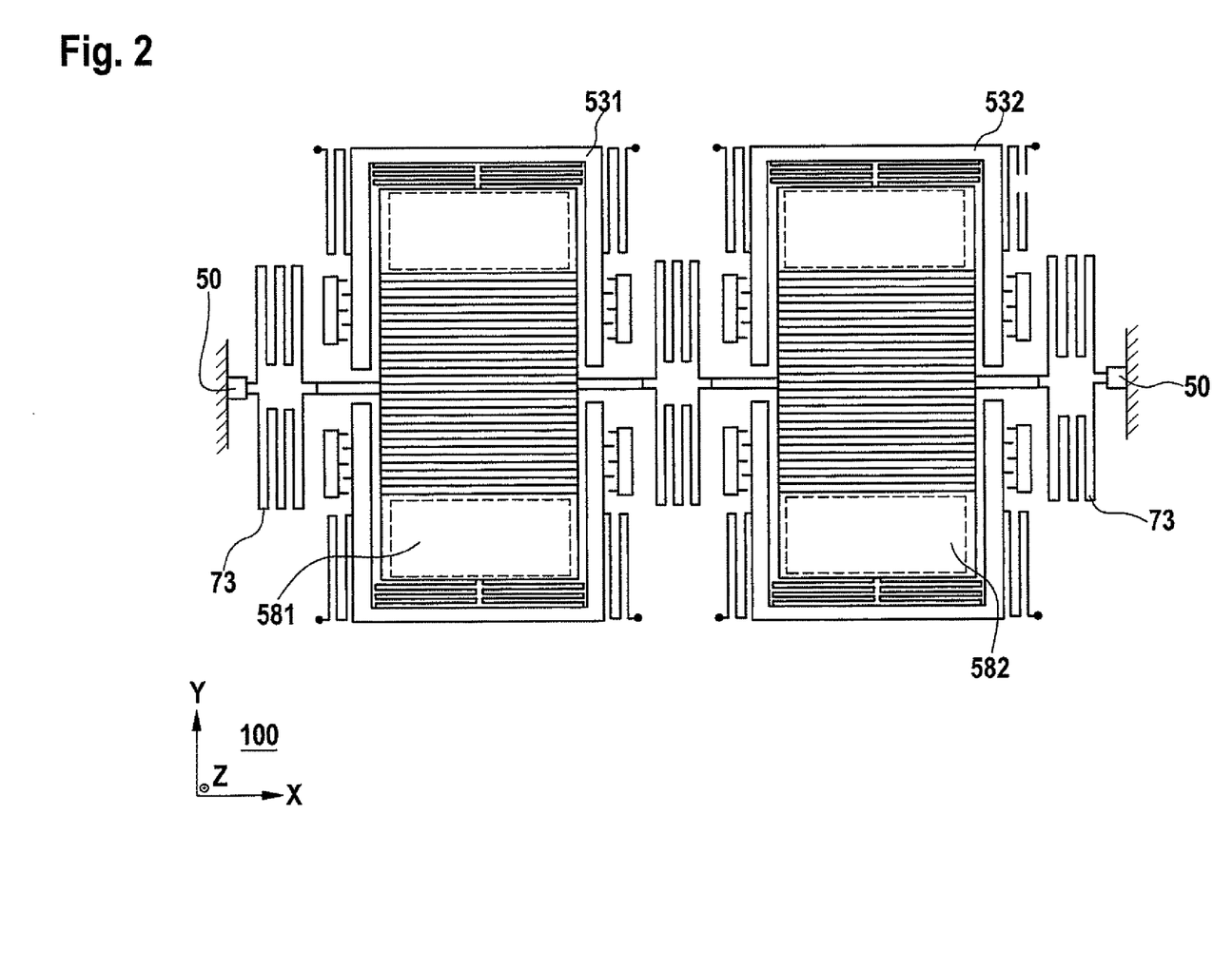
FIG. 2 is a schematic illustration in plan view of a yaw rate sensor in accordance with an exemplary embodiment of the present invention.

FIG. 2 is a schematic illustration in plan view of a yaw rate sensor. In contrast to the arrangement described above, first and second driving structures 531, 532 each have an opening on the side remote from the coupling element. Through that opening, Coriolis elements 581, 582 are connected to substrate 50 via attachment spring elements 73. Due to that additional attachment to substrate 50, it is possible to reduce the natural frequencies of the first and second detection natural mode. Alternatively, it is possible for a single comparatively large region of a trampoline structure to be arranged centrally in each of Coriolis elements 581, 582 and for two grid structures 70 to be arranged in the regions above and below the trampoline structure.

Figure 3:
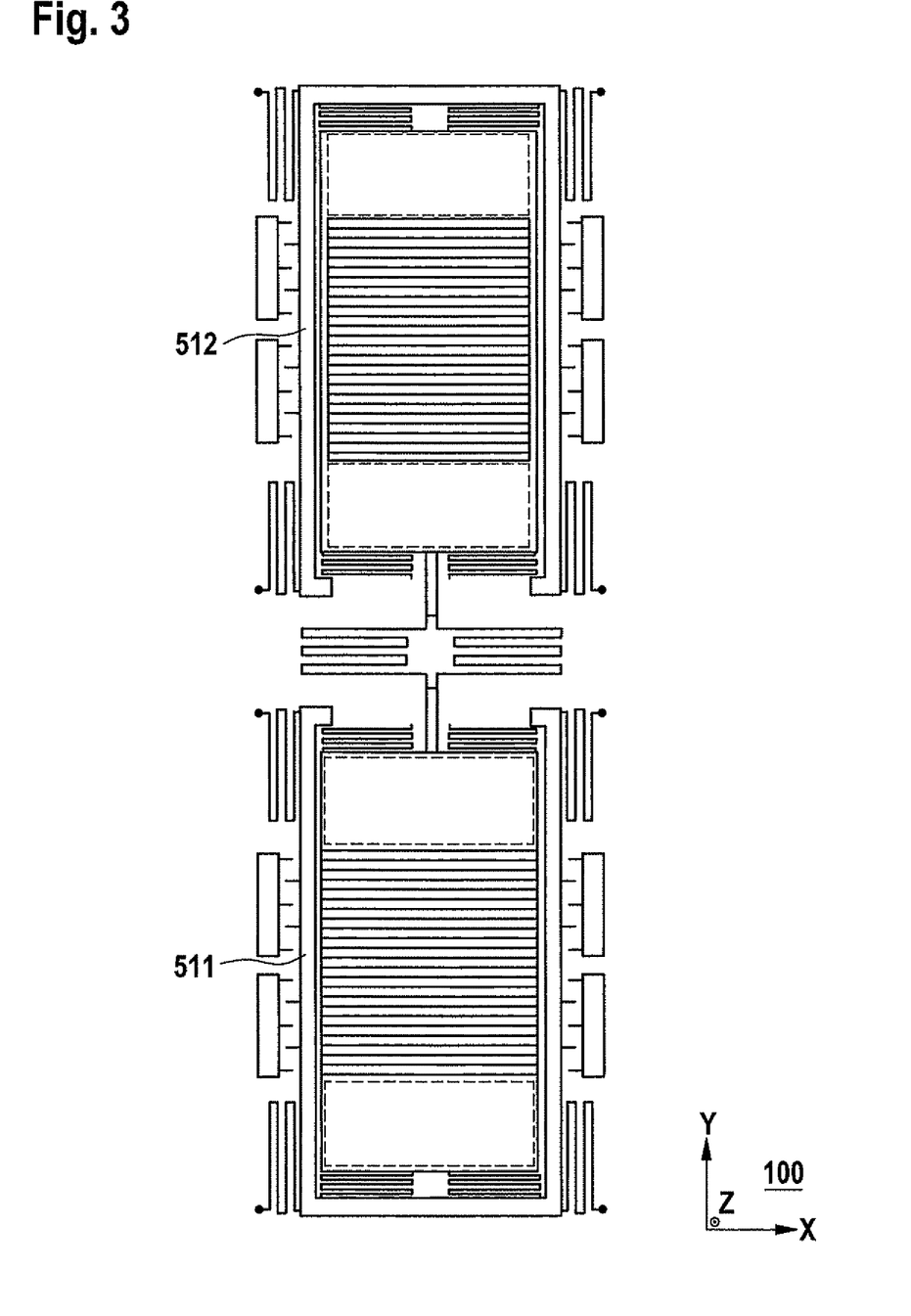
FIG. 3 is a schematic illustration in plan view of a yaw rate sensor in accordance with an exemplary embodiment of the present invention.

FIG. 3 is a schematic illustration in plan view of a yaw rate sensor. In contrast to the first-described arrangement, first partial structure 511 is disposed parallel to second axis Y beside second partial structure 512 (inverse tuning fork principle). As a result of that arrangement, a comparatively high insensitivity to interfering acceleration, especially centrifugal acceleration in the case of rotation about second or third axis Y, Z, is achieved. Alternatively, it is possible for a single comparatively large region of a trampoline structure to be arranged centrally in each of Coriolis elements 581, 582 and for two grid structures 70 to be arranged in the regions above and below the trampoline structure.

Figure 4:
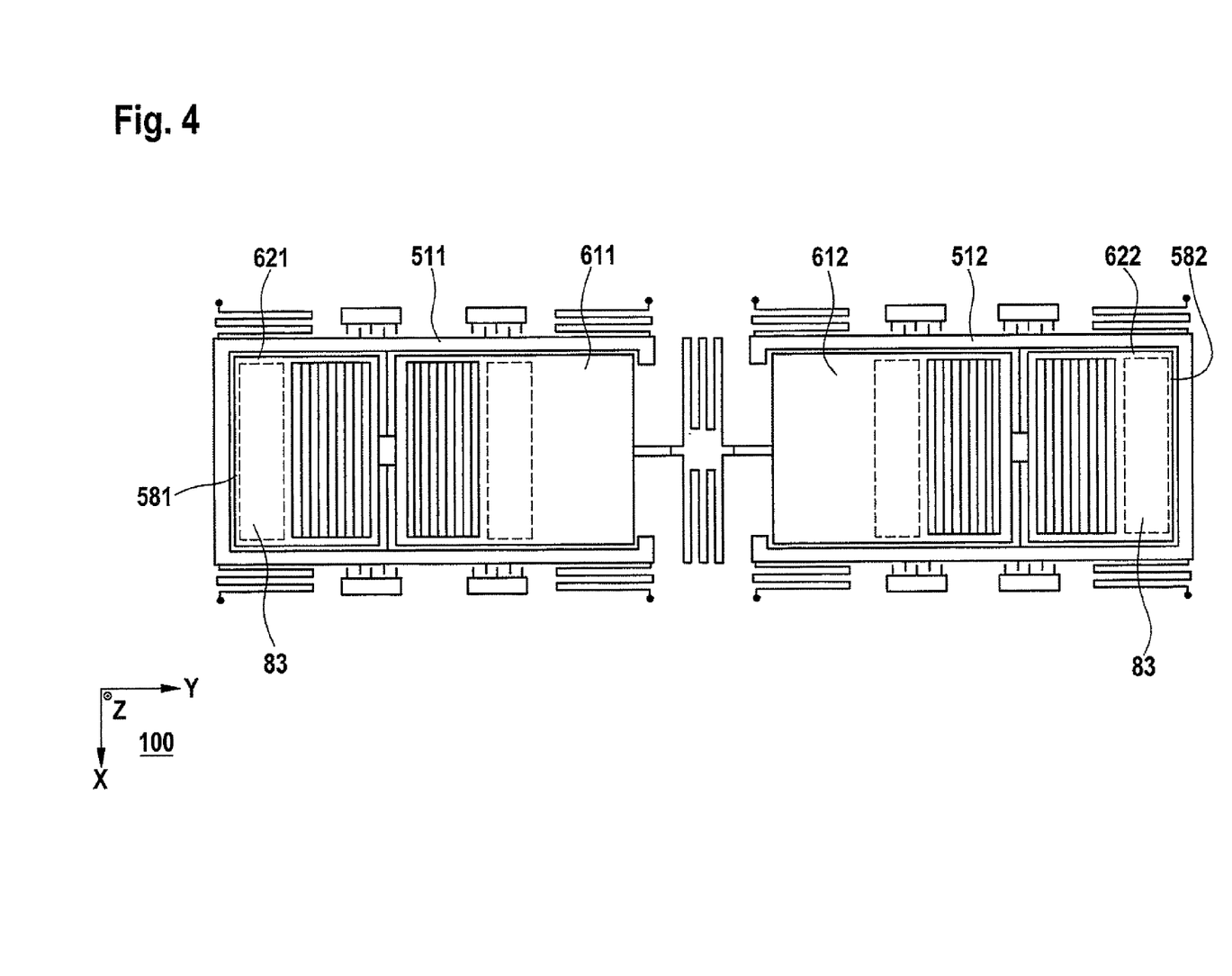
FIG. 4 is a schematic illustration in plan view of a yaw rate sensor in accordance with an exemplary embodiment of the present invention.

FIG. 4 is a schematic illustration in plan view of a yaw rate sensor. In contrast to the arrangement described above, detection of a yaw rate about second axis Y is carried out according to the rocker principle. For that purpose, Coriolis elements 581, 582 are connected to partial structures 511, 512 via first and second torsion spring elements. The torsion spring elements form a first and second axis of rotation parallel to main extent plane 100. Coriolis elements 581, 582 have asymmetrical mass distributions with respect to the axis of rotation, with the result that Coriolis elements 581, 582 are rotatable about the axis of rotation by a parallel Coriolis force parallel to third axis Z. Due to the asymmetrical mass distribution, Coriolis elements 581, 582 have heavy sides 611, 612 and light sides 621, 622. The mass moments of inertia of heavy sides 611, 612 with respect to the axes of rotation are greater than the mass moments of inertia of the light sides 621, 622 with respect to the axes of rotation. Heavy sides 611, 612 are connected to each other via the coupling element. Beneath Coriolis elements 581, 582, detection electrodes 83 are disposed on the substrate. Those regions are marked by dashed or dotted lines. Rotation of the Coriolis elements 581, 582 about the axis of rotation causes a change in capacitance between detection electrodes 83 and Coriolis elements 581, 582. That change in capacitance is detectable differentially. In addition, interfering linear accelerations parallel to third axis Z are suppressed. Alternatively, it is possible for partial structures 511, 512 to be driven according to the tuning fork principle.

Figure 5:
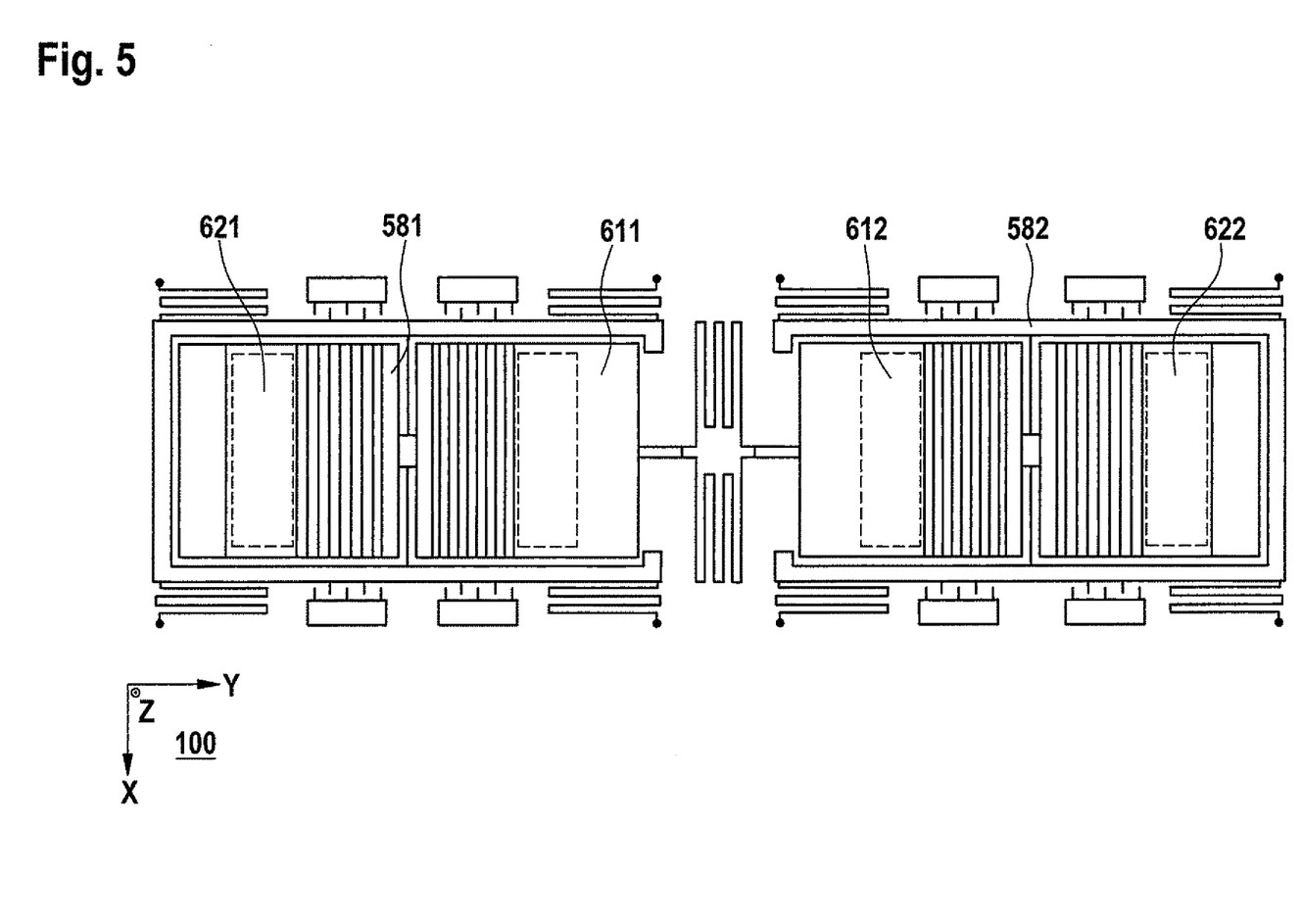
FIG. 5 is a schematic illustration in plan view of a yaw rate sensor in accordance with an exemplary embodiment of the present invention.

FIG. 5 is a schematic illustration in plan view of a yaw rate. In contrast to the arrangement described above, the axis of rotation of Coriolis elements 581, 582 is disposed centrally relative to the extent of Coriolis elements 581, 582 parallel to second axis Y. In this case also, driving according to the tuning fork principle is possible as an alternative.

Figure 6:
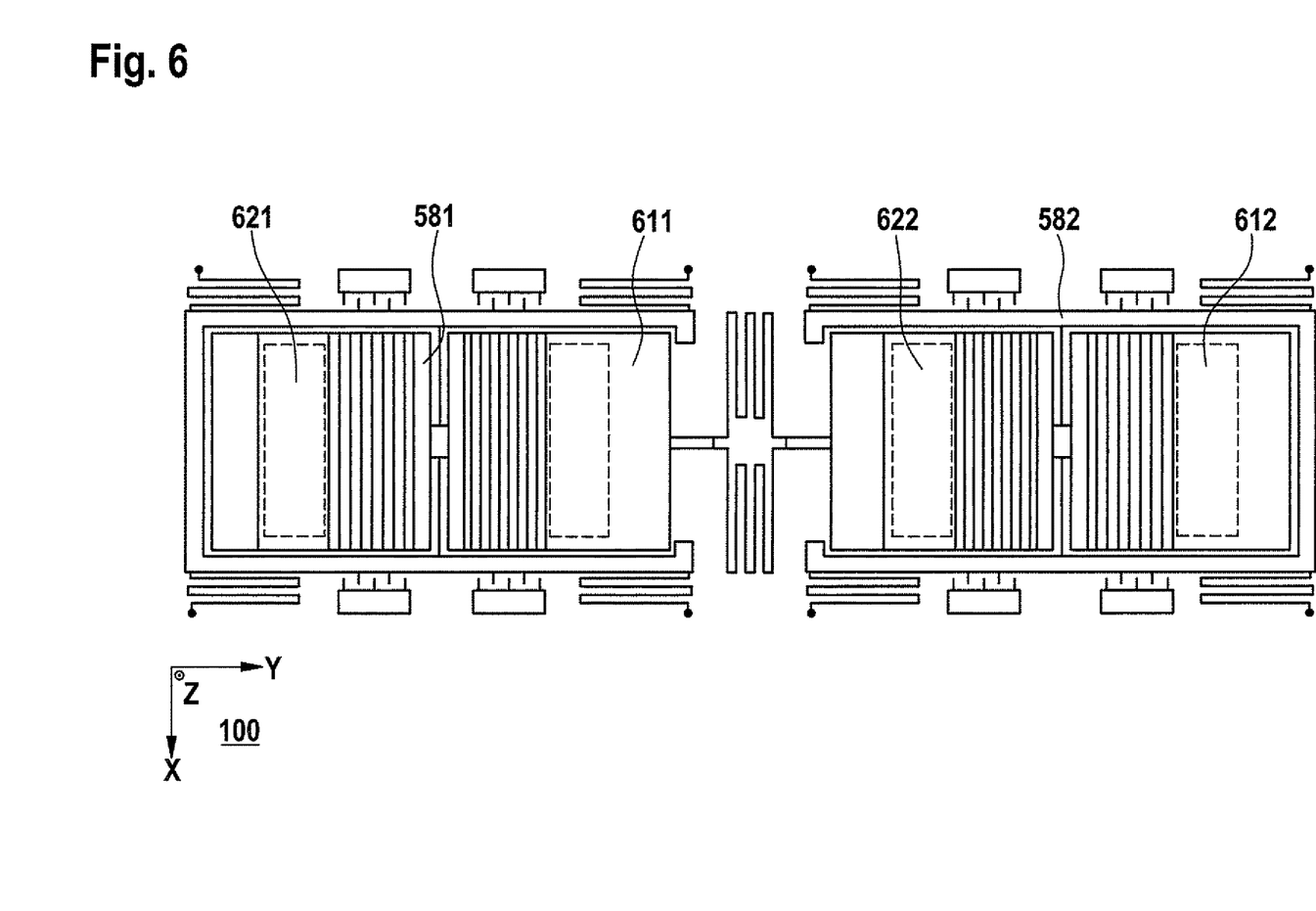
FIG. 6 is a schematic illustration in plan view of a yaw rate sensor in accordance with an exemplary embodiment of the present invention.

FIG. 6 is a schematic illustration in plan view of a yaw rate. In contrast to the arrangement described above, first heavy side 611 of first Coriolis element 581 is connected via coupling element 101 to second light side 622 of second Coriolis element 582. With that arrangement of Coriolis elements 581, 582, in the case of a yaw rate about second axis Y an anti-phase torsional movement of the Coriolis elements about the axis of rotation occurs. In the case of interfering accelerations parallel to third axis Z, an in-phase torsional movement of Coriolis elements 581, 582 about the axis of rotation occurs. Coupling element 101 is loaded to a greater extent by the in-phase torsional movement than in the case of anti-phase torsional movement. The in-phase torsional movement is impeded to a comparatively great extent by coupling element 101, with the result that the displacement of Coriolis elements 581, 582 parallel to third axis Z is smaller than in the case of anti-phase torsional movement. In that manner, the second interfering natural frequency of the second interfering natural mode is increased in comparison with the second detection natural frequency of the second detection natural mode. By virtue of that increase, the vibration resistance of the yaw rate sensor is considerably improved. In this case also, driving according to the tuning fork principle is possible as an alternative.

Figure 7:
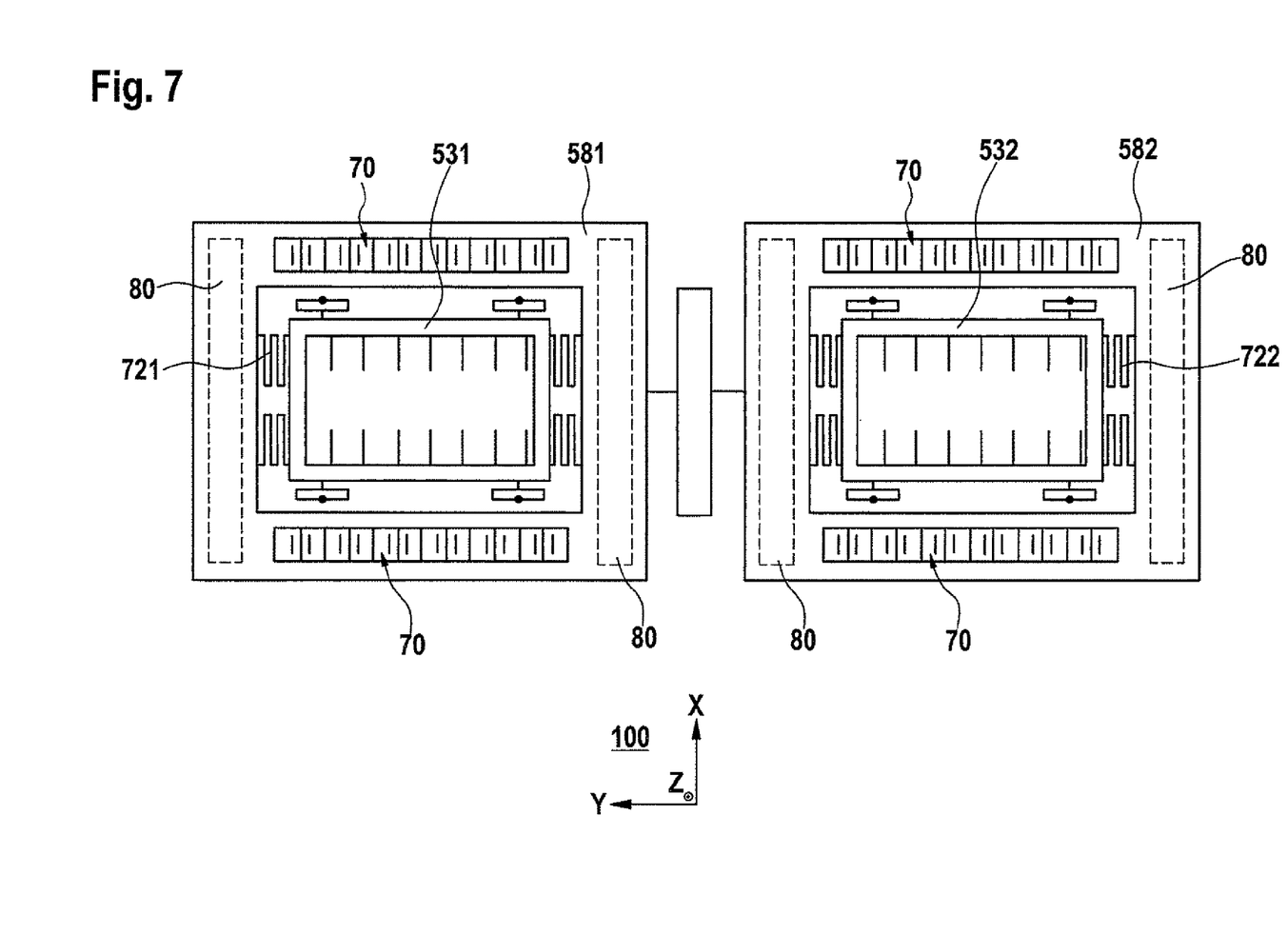
FIG. 7 is a schematic illustration in plan view of a yaw rate sensor in accordance with an exemplary embodiment of the present invention.

FIG. 7 is a schematic illustration in plan view of a yaw rate sensor. Coriolis elements 581, 582 are configured as frames and surround respective driving structures 531, 532. Coriolis elements 581, 582 are connected to respective driving structures 531, 532 via spring elements 721 and further spring elements 722. Coriolis elements 581, 582 each have two regions with a trampoline structure having further electrodes 80 (marked by dashed lines) for detection of yaw rates about second axis Y and each have two regions with grid structures 70 for detection of yaw rates about third axis Z.

Alternatively, it is possible for the arrangement to be excited according to the tuning fork principle. It is also possible as an alternative for Coriolis elements 581, 582 to be connected to substrate 50 via attachment spring elements 73.

Figure 8:
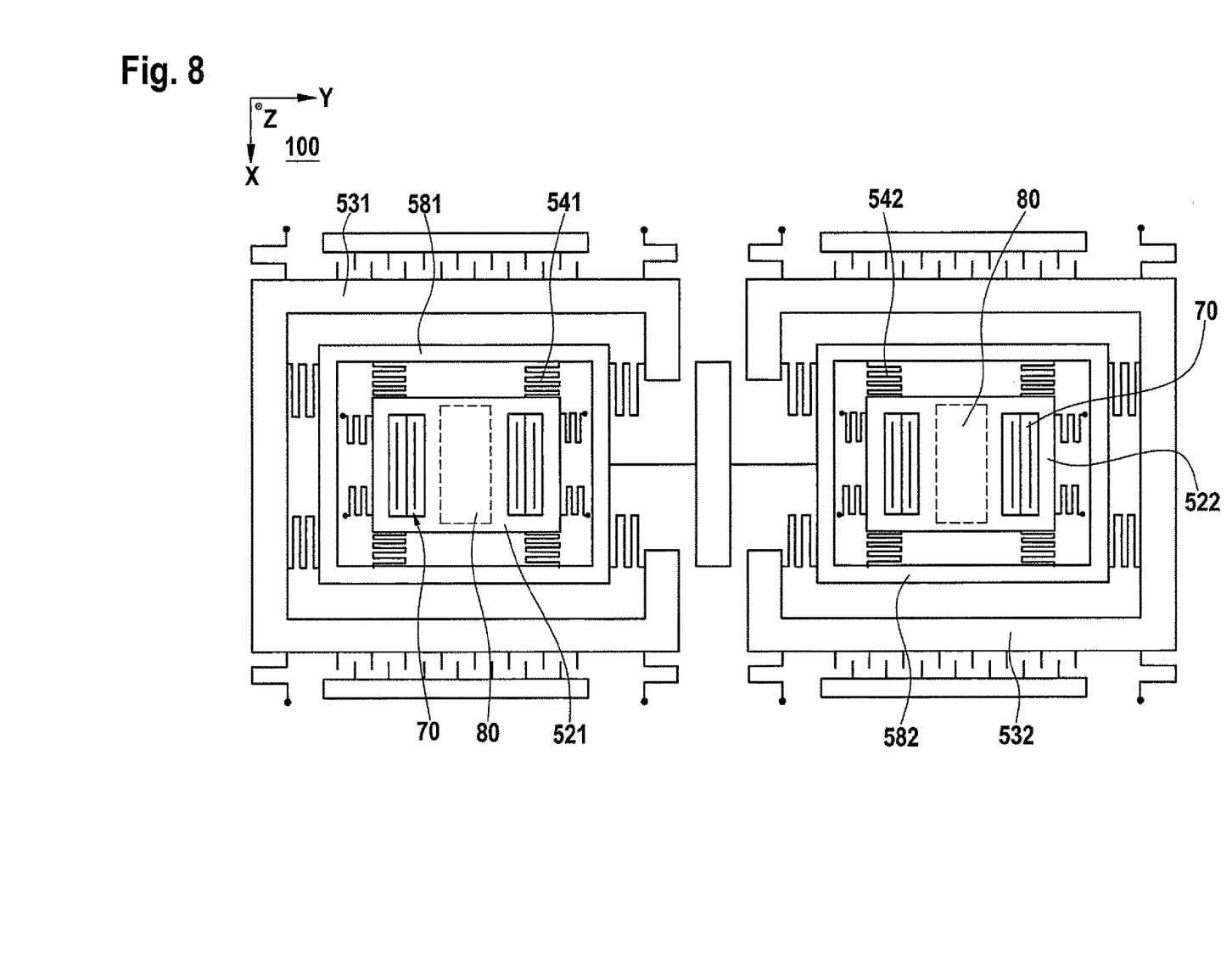
FIG. 8 is a schematic illustration in plan view of a yaw rate sensor in accordance with an exemplary embodiment of the present invention.

FIG. 8 is a schematic illustration in plan view of a yaw rate sensor. Partial structures 511, 512 have detection masses 521, 522 which are attached to substrate 50 in a fixed position parallel to first axis X and are displaceable parallel to second and third axis Y, Z. Detection masses 521, 522 are connected to Coriolis elements 581, 582 via detection springs 541, 542, detection springs 541, 542 being configured to be rigid parallel to second and third axis Y, Z. Detection masses 521, 522 each have two regions with grid structures 70 for detection of yaw rates about third axis Z and one region with a trampoline structure with further electrodes 80 for detection of yaw rates about second axis Y (marked by dashed lines). In the case of Coriolis forces parallel to second and third axis Y, Z, Coriolis elements 581, 582 are displaced parallel to second and third axis Y, Z, respectively. By virtue of rigid detection springs 541, 542 parallel to second and third axis Y, Z, detection masses 521, 522 move concomitantly. Due to the fixed-position attachment of detection masses 521, 522 in the driving direction, it is possible for the detection movements to be largely decoupled from the driving movement, thereby considerably reducing mechanical crosstalk between driving movement and detection movements (reduction of the mechanical quadrature).

What is claimed is:

1. A yaw rate sensor, comprising:
a substrate having a main extent plane;
a first and a second partial structure disposed parallel to the main extent plane, the first partial structure having a first driving structure and the second partial structure having a second driving structure, the first and second partial structures being excitable by a driving device, via the first and second driving structures, into oscillation parallel to a first axis parallel to the main extent plane, the first partial structure having a first Coriolis element and the second partial structure having a second Coriolis element;
wherein the first and second Coriolis elements are displaceable by a Coriolis force parallel to a second axis perpendicular to the first axis and parallel to a third axis perpendicular to the first and second axes, the second axis extending parallel to the main extent plane, and the first Coriolis element being connected to the second Coriolis element via a coupling element.

2. The yaw rate sensor according to claim 1, wherein the first and second Coriolis elements are connected to the substrate via attachment spring elements.

3. The yaw rate sensor according to claim 1, wherein the first partial structure is disposed parallel to the second axis beside the second partial structure.

4. The yaw rate sensor according to claim 1, wherein the first and second Coriolis elements are arranged as frames, the first Coriolis element being connected to the first driving structure via spring elements, the second Coriolis element being connected to the second driving structure via further spring elements, the first Coriolis element surrounding the first driving structure and the second Coriolis element surrounding the second driving structure.

5. The yaw rate sensor according to claim 1, wherein the first partial structure has a first detection mass and the second partial structure has a second detection mass, the first and second detection masses being attached to the substrate in a fixed position parallel to the first axis and being displaceable parallel to the second axis and to the third axis, the first detection mass being coupled to the first Coriolis element via first detection springs and the second detection mass being coupled to the second Coriolis element via second detection springs, the first and second detection springs being configured to be rigid parallel to the second axis and parallel to the third axis.

6. The yaw rate sensor according to claim 1, wherein the Coriolis elements are configured as rockers, the first Coriolis element being connected to the first partial structure via first torsion spring elements and the second Coriolis element being connected to the second partial structure via second torsion spring elements, the first torsion spring elements forming a first axis of rotation which is parallel to the main extent plane and the second torsion spring elements forming a second axis of rotation which is parallel to the main extent plane, the first Coriolis element having an asymmetrical mass distribution with respect to the first axis of rotation and the second Coriolis element having an asymmetrical mass distribution with respect to the second axis of rotation, the first Coriolis element being rotatable about the first axis of rotation by a Coriolis force acting parallel to the third axis and the second Coriolis element being rotatable about the second axis of rotation by a Coriolis force acting parallel to the third axis.

7. The yaw rate sensor according to claim 6, wherein the first axis of rotation parallel to the second axis extends centrally relative to the extent of the first Coriolis element parallel to the first axis, and the second axis of rotation parallel to the second axis extends centrally relative to the extent of the second Coriolis element parallel to the first axis.

8. The yaw rate sensor according to claim 6, wherein the first Coriolis element has a first heavy side and a first light side and the second Coriolis element has a second heavy side and a second light side, the first and second heavy sides having a greater mass moment of inertia with respect to the first and second axis of rotation than the first and second light sides, the first heavy side being connected via the coupling element to the second heavy side.

9. The yaw rate sensor according to claim 8, wherein the first heavy side is connected via the coupling element to the second light side.

10. The yaw rate sensor according to claim 1, wherein the coupling element is free to move parallel to the first, second, and third axis.

11. The yaw rate sensor according to claim 4, wherein the spring elements and the further spring elements connecting the Coriolis elements to the respective driving structures are free to move parallel to the second and third axis.

* * * * *